Jan. 25, 1938. E. R. FITCH 2,106,479
FLUID PRESSURE BRAKE
Filed Oct. 17, 1936
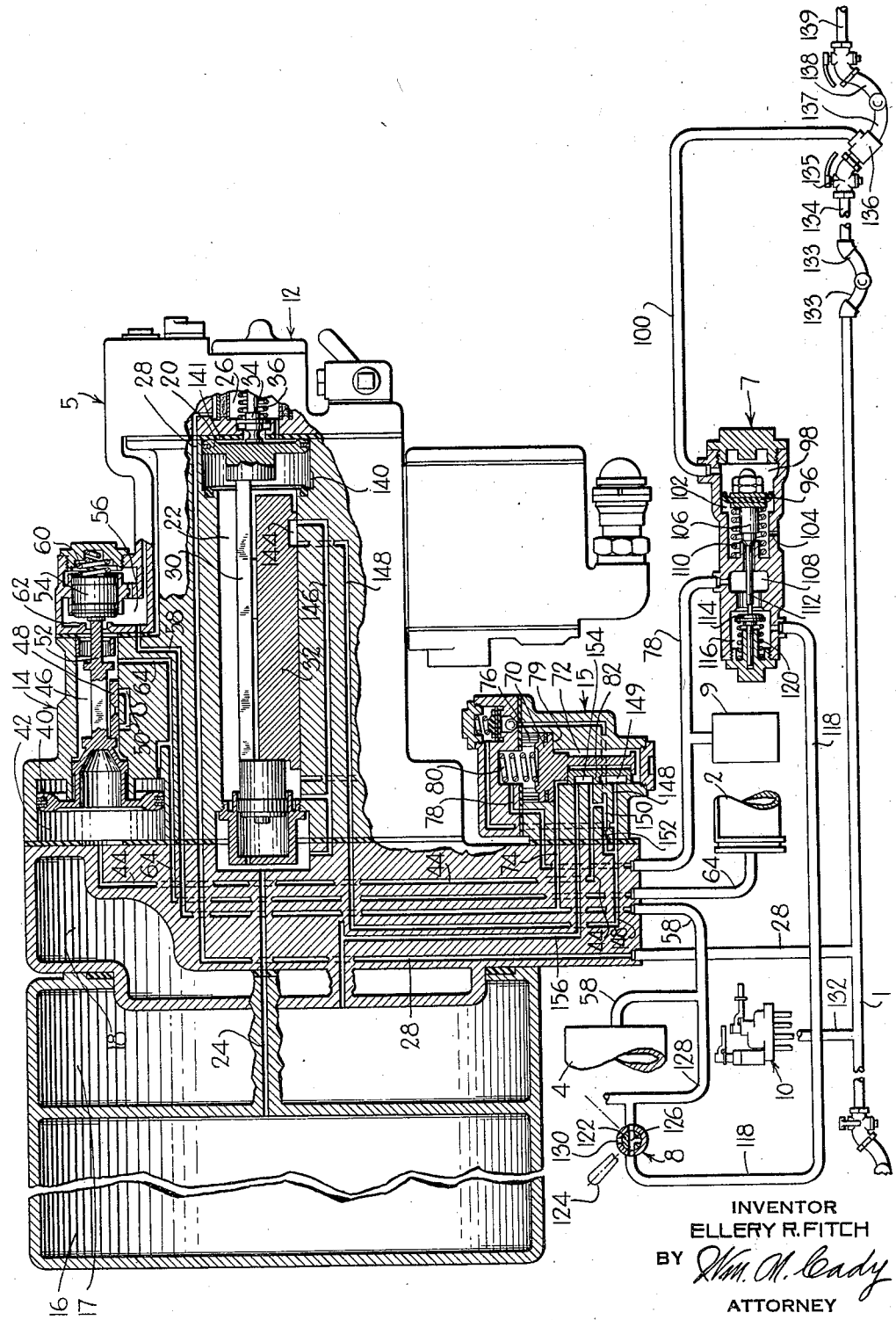
INVENTOR
ELLERY R. FITCH
BY Wm. M. Cady
ATTORNEY Patented Jan. 25, 1938

2,106,479

UNITED STATES PATENT OFFICE 2,106,479

FLUID PRESSURE BRAKE

Ellery R. Fitch, Irwin, Pa., assignor to The Westinghouse Air Brake Company, Wilmerding, Pa., a corporation of Pennsylvania Application October 17, 1936, Serial No. 106,099

21 Claims. (Cl. 303—40)

This invention relates to fluid pressure brakes and more particularly to a locomotive brake equipment of the type disclosed in U. S. Patent No. 2,009,841, issued July 30, 1935, to Ellis E. Hewitt, and in the U. S. Patent No. 2,045,159, issued June 23, 1936 to Charles H. McKinstry.

In the above identified patents there is shown a locomotive brake equipment having a distributing valve having an application portion operative on an increase in fluid pressure to supply fluid under pressure to the brake cylinder to effect an application of the brakes. This distributing valve has an equalizing portion subject to the opposing pressures of the fluid in the brake pipe and of the fluid in a pressure chamber and operative on a reduction in brake pipe pressure to supply fluid under pressure from the pressure chamber to the application portion.

In the brake equipment shown in certain of the above identified patents a delay valve is shown which is operative in one position to restrict the rate of flow of fluid to the application portion on an emergency application of the brakes, and thereby restrict the rate of build up of brake cylinder pressure on the locomotive. This feature is valuable where the locomotive is employed to haul long trains, and prevents too rapid build up of brake cylinder pressure on the locomotive which might result in too rapid run-in of the slack in the train.

If, however, the engine is not employed to haul a train, but is running light, and the delay valve is conditioned to restrict the rate of supply of fluid to the application portion, the application of the brakes on the locomotive may be retarded too much so as to prevent the engineer from stopping the locomotive as soon as necessary.

It is an object of this invention to provide a locomotive brake equipment of the type shown in the above identified patents and having means to prevent the delay valve from being operated to restrict the supply of fluid under pressure to the application portion at a time that the locomotive is not employed to haul a train.

A further object of the invention is to provide a locomotive brake equipment of this type having a delay valve which may be operated to restrict the rate of supply of fluid to the application portion, together with control means for the delay valve which is operative to condition the delay valve to restrict the flow of fluid to the application portion only when the locomotive is employed to haul a train.

Another object of the invention is to provide an improved locomotive brake equipment of this type and having means automatically operative when the locomotive is not employed to haul a train to condition the delay valve to permit the rapid supply of fluid under pressure to the application portion by the equalizing portion.

A further object of the invention is to provide a locomotive brake equipment of the type described and having means responsive to the pressure of the fluid supplied to the brake pipe of the train hauled by the locomotive for controlling operation of the delay valve incorporated in the locomotive brake equipment.

Another object of the invention is to provide an improved locomotive brake equipment.

Other objects of the invention and features of novelty will be apparent from the following description taken in connection with the accompanying drawing, the single figure of which is a diagrammatic view, largely in section, of a portion of a locomotive fluid pressure brake equipment embodying my invention.

Referring to the drawing, the brake equipment shown therein comprises a brake pipe 1, a brake cylinder 2, a main reservoir 4, a distributing valve device indicated generally by the reference numeral 5, a valve device 7, a manually operable valve device 8, a timing reservoir 9, and an engineer's brake valve device shown diagramatically at 10.

This locomotive brake equipment is substantially identical with the locomotive brake equipments shown in the above identified patents, except in certain particulars, as will hereinafter more fully appear, and only such portions of the brake equipment are illustrated and described herein as are essential to the understanding of this invention.

Referring to the drawing the distributing valve device 5 comprises an equalizing portion 12, an application portion 14, a delay valve device 15, a pressure chamber 16, an application chamber 17, and a reduction chamber 18.

The equalizing portion 12 comprises a piston 20 which is reciprocable in a bore in the body of the distributing valve device 5, and has at one side thereof a valve chamber 22 which is constantly connected by way of a passage 24 with the pressure chamber 16. The piston 20 has at the other side thereof a chamber 26 which is constantly connected to the brake pipe 1 by way of a branch passage and pipe 28.

The piston 20 has a piston stem 30 formed integral therewith which operates a main slide valve 32 mounted in the chamber 22 and slidable upon a seat formed on the body of the distributing valve device 5.

A plunger 34 is mounted in the chamber 26 and is yieldingly urged to the left, as viewed in the drawing, by a spring 36 so as to oppose movement of the piston 20 to the emergency position, which is the position in which the piston is shown in the drawing.

The application means 14 comprises a piston 40 which is mounted in a bore in the body of the distributing valve device and has at one side thereof a chamber 42, which is connected to a passage 44 which is controlled by the delay valve device 15. The piston 40 has at the other side thereof a valve chamber 46 in which is mounted a slide valve 48 which controls communication between the valve chamber 46 and the atmosphere by way of ports 50.

The piston 40 has a stem 52 formed integral therewith which is adapted to engage a valve 54 which is mounted in a chamber 56, which is constantly connected by way of a passage and pipe 58 with the main reservoir 4. The valve 54 is yieldingly urged by a spring 60 into engagement with a seat rib 62 surrounding a port communicating with the chamber 56 and with the valve chamber 46. The valve chamber 46 is constantly connected by way of a passage and pipe 64 with the brake cylinder 2.

The delay valve device 15 comprises a body having a bore therein in which is mounted a piston 70 having at one side thereof a valve chamber 72, which is constantly connected by way of a passage 74 with the passage 58 and thereby with the main reservoir 4.

The piston 70 has at the other side thereof a chamber 76 which is constantly connected by way of a passage and pipe 78 with the timing reservoir 9 and the valve device 7. A spring 80 is mounted in the chamber 76 and yieldingly urges the piston 70 downwardly, as viewed in the drawing, to the position in which the piston is shown, in which it engages a shoulder 79 on the body of the valve device.

The piston 70 has a stem formed integral therewith which operates a slide valve 82 mounted in the valve chamber 72 and adapted to control communication with certain ports in the seat of the slide valve as will hereinafter more fully appear.

The valve device 7 comprises a body having a bore therein in which is mounted a piston 96 having at one side thereof a chamber 98, which is constantly connected by way of a pipe 100 with a point on the brake pipe 1, as will hereinafter more fully appear. The piston 96 has at the other side thereof a chamber 102 which is constantly connected to the atmosphere by way of a restricted passage 104.

The piston 96 has secured thereto a valve 106 which is adapted to seat upon a seat surrounding a passage leading from a chamber 108, to which is connected the pipe 78 leading from the delay valve device 15. A spring 110 is mounted in the chamber 102 and yieldingly urges the piston 96 to the right, as viewed in the drawing, so as to move the valve 106 away from its seat.

The valve 106 has a stem 112 formed integral therewith and this stem loosely extends through the passage between the chambers 102 and 108 and is adapted to engage the face of a valve 114, which is mounted in a chamber 116, which is constantly connected by way of a pipe 118 with the manually operable valve device 8. The valve 114 is adapted to seat upon a seat surrounding a passage connecting the chamber 116 and the chamber 108, and is yieldingly urged to the seated position by means of a spring 120. The stem 112 is of such length that when the valve 106 is seated the end of the stem 112 will maintain the valve 114 away from its seat.

The manually operable valve device 8 comprises a body having a bore therein in which is mounted a plug valve 122, which is movable between spaced positions by means of a handle 124. The plug valve 122 has a passage therein indicated at 126 which in one position of the handle 124 establishes communication between a pipe 128 leading from the main reservoir 4, and the pipe 118 leading to the valve device 7, while in the other position of the handle 124 the plug valve 122 cuts off communication between the pipe 128 and the pipe 118, and the passage 126 connects the pipe 118 to the atmosphere by way of a port 130.

The engineer's brake valve device 10 may be constructed as shown in the above identified patents, and controls the supply of fluid under pressure to and the release of fluid under pressure from the brake pipe 1 through a pipe 132 in the usual manner.

The brake pipe 1 extends the entire length of the locomotive and is connected through suitable flexible hose and couplings 133 to the portion 134 of the brake pipe on the locomotive tender. An angle cock 135 is interposed in the brake pipe at the back of the tender to control communication through the brake pipe, while a pipe T 136 is secured to the angle cock 135 and has connected thereto a flexible hose and coupling 137 which is adapted to be connected to a similar flexible hose and coupling 138 on a car of a train being hauled by the locomotive.

The pipe 100 associated with the valve device 7 is connected to a branch of the pipe T 136 so as to communicate with the brake pipe at a point on the side of the angle cock 135 remote from the point in the brake pipe at which the pipe 132 associated with the engineer's brake valve device 10 communicates therewith.

In initially charging the equipment the automatic portion of the engineer's brake valve device 10 may be turned to the release position, in which fluid under pressure is supplied from the main reservoir 4 through the pipe 132 to the brake pipe 1, and after the valve device has been in this position for a time interval it is turned to the running position, in which fluid under pressure is supplied to the pipe 132 by a feed valve device, not shown, at the pressure carried in the brake pipe.

Fluid under pressure supplied by operation of the engineer's brake valve device 10 to the brake pipe 1 flows therefrom by way of the branch pipe and passage 28 to the chamber 26 in the distributing valve device 5, and on an increase in the pressure of the fluid in this chamber the piston 20 is moved to the left, as viewed in the drawing, to a position to open communication through the feed groove 140 to permit fluid under pressure to flow to the valve chamber 22, and therefrom by way of the passage 24 to the pressure chamber 16 to charge the valve chamber 22 and the pressure chamber 16 with fluid under pressure at the pressure carried in the brake pipe.

When the locomotive is not employed to haul a train the angle cock 135 is in the closed position and the hose and coupling 137 at the rear of the tender is not connected to another hose and coupling, but is open to the atmosphere. As a result the chamber 98 of the valve device 7 is open to the atmosphere by way of the pipe 100, and the piston 96 is moved by the spring 110 to a position to move the valve 106 away from its seat and to permit the valve 114 to be moved to the seated position by the spring 120.

When the valve 106 is moved away from its seat the chamber 76 of the delay valve device 15 is connected to the atmosphere by way of the passage and pipe 78, the chambers 108 and 102 and the restricted passage 104. As the valve 114 is in the seated position the supply of fluid under pressure to the chamber 76 is cut off even though the manually operated valve device 8 is in the position in which it supplies fluid under pressure from the reservoir 4 to the pipe 118.

As the chamber 76 is connected to the atmosphere the piston 70 is moved upwardly to the non-delay position against the spring 80 by the higher pressure of the fluid in the chamber 72, while the slide valve 82 is moved to the position in which the cavity 149 therein establishes a communication between the passage 148 and the passage 44 which by-passes the choke or restriction 152.

If at this time the engineer desires to effect an emergency application of the brakes he turns the automatic portion of the engineer's brake valve device 10 to the emergency position in which the supply of fluid under pressure to the brake pipe 1 is cut off, and in which fluid under pressure is released from the brake pipe 1 at a rapid rate, thereby producing a rapid reduction in the pressure of the fluid in the brake pipe.

On this reduction in the pressure of the fluid in the brake pipe at an emergency rate there is a rapid reduction in the pressure of the fluid in the chamber 26 at the face of the piston 20 of the equalizing portion 12 of the distributing valve device 5, and this piston is moved to the right, as viewed in the drawing, by the fluid under pressure in the valve chamber 22, and the piston 20 moves the plunger 34 against the spring 36 until the face of the piston 20 engages a gasket 141. On this movement of the piston 20 the main slide valve 32 is moved to a position in which a cavity 144 therein establishes communication between a passage 146, which communicates with the valve chamber 22 and thereby with the pressure chamber 16, and a passage 148 leading to the delay valve device 15 so that fluid under pressure may flow from the pressure chamber 16 and the valve chamber 22 to the passage 148.

Fluid under pressure supplied to the passage 148 flows to the delay valve device 15 and flows at a rapid rate through the cavity 149 in the slide valve 82 to the passage 44, by-passing the choke 152. Fluid under pressure supplied to the passage 44 flows therethrough to the chamber 42 at the face of the piston 40 of the application portion 14, and on an increase in the pressure of the fluid in this chamber the piston 40 is moved to the right, as viewed in the drawing, to the application position, which is the position in which it is shown. On movement of the piston 40 to this position the end of the stem 52 presses against the valve 54 and moves it against the spring 60 away from the seat rib 62 so as to permit fluid under pressure supplied from the main reservoir 4 to the chamber 56 to flow therefrom to the valve chamber 46, and thence by way of the passage 64 to the brake cylinder 2 to increase the pressure of the fluid in the brake cylinder and thereby effect an application of the brakes. In this position of the piston 40 the slide valve 48 is held in a position to cut off the flow of fluid from the valve chamber 46 to the atmosphere through the ports 50.

As fluid under pressure may flow at a rapid rate to the application portion 14 the pressure of the fluid in the chamber 42 will increase rapidly, and this portion will operate to supply fluid under pressure to the brake cylinder at a rapid rate and thereby quickly apply the brakes.

It will be seen that the valve device 7 automatically operates when the locomotive is not employed to haul a train to insure that the delay valve device 15 will occupy its non-delay position and permit fluid under pressure to be supplied at a rapid rate to the application portion, even though the manually operable valve device 8 is in the position in which it would normally condition the delay valve device to move to the delay position.

On a subsequent movement of the automatic portion of the engineer's brake valve device 10 to the release position in which fluid under pressure is supplied to the brake pipe 1, there is an increase in the pressure of the fluid in the chamber 26 at the face of the piston 20 of the equalizing portion 12 of the distributing valve device 5, and this portion operates as described in detail in the above identified patents to release fluid under pressure from the chamber 42 at the face of the piston 40 of the application portion 14, while the application portion 14 operates to release fluid under pressure from the brake cylinder 2.

The valve device 7 provided by this invention operates automatically when the locomotive is employed to haul a train to permit the delay valve device 15 to be controlled by the manually operated valve device 8 to restrict the rate of supply of fluid under pressure to the application portion 14 and thereby restrict the rate of application of the brakes.

When the locomotive is employed to haul a train the angle cock 135 at the rear of the tender of the locomotive is in the open position and the flexible hose and coupling 137 on the tender is coupled to a similar flexible hose and coupling 138 on a car of the train hauled by the locomotive so that fluid under pressure supplied to the brake pipe 1 on the locomotive may flow therefrom through the angle cock 135 to the flexible hose and coupling 137 and thence to the flexible hose and coupling 138 and the brake pipe 139 on a car of a train hauled by the locomotive to charge the brake equipment on the cars of the train.

In addition, fluid under pressure supplied to the brake pipe 1 flows through the angle cock 135 and thence through the pipe 100 to the chamber 98 at the face of the piston 96 of the valve device 7, and on an increase in the pressure of the fluid in this chamber to a predetermined value the piston 96 is moved to the left, as viewed in the drawing, against the spring 110 to the position in which it is shown in the drawing, in which the valve 106 is held in the seated position to cut off communication between the chamber 108 and the chamber 102.

On movement of the piston 96 to this position the stem 112 presses against the face of the valve 114, and moves it against the spring 120 away from its seat so as to permit communication between the chamber 116 and the chamber 108.

If the engineer desires to condition the locomotive brake equipment to operate so that the application of the brakes on the locomotive will be delayed on an emergency application of the brakes he will turn the handle 124 of the manually operated valve device 8 to the position in which it is shown in the drawing, in which the plug valve 122 is in a position in which the passage 126 establishes communication between the pipe 128 and pipe 118 so that fluid under pressure from the main reservoir 4 may flow to the pipe 118 and through this pipe to the chamber 116 of the valve device 7. Fluid under pressure supplied to the chamber 116 flows therefrom past the open valve 114 to the chamber 108, and thence through the pipe 78 to the timing reservoir 9, and to the chamber 76 at the face of the piston 70 of the delay valve device 15 to charge these with fluid under pressure.

As the pressures on the opposite faces of the piston 70 of the delay valve device 15 are substantially equal the piston 70 is moved by the spring 80 into engagement with the shoulder 79, thereby moving the slide valve 82 to a position in which the cavity 149 therein no longer establishes communication between the passage 148 and the passage 44, and in which a cavity 154 in the slide valve establishes communication between the passage 44 and a passage 156 leading to the application chamber 17.

Fluid under pressure supplied to the brake pipe 1 flows therefrom through the branch pipe and passage 28 to the chamber 26 at the face of the piston 20 of the equalizing portion 12, and on an increase in the pressure of the fluid in this chamber the piston 20 is moved to the left, as viewed in the drawing, so as to open communication through the feed groove 140 to permit fluid under pressure to flow from the chamber 26 through the feed groove to the valve chamber 22 and thence by way of the passage 24 to the pressure chamber 16 to charge these chambers with fluid under pressure at the pressure carried in the brake pipe.

On a subsequent reduction in the pressure of the fluid in the brake pipe at an emergency rate to effect an emergency application of the brakes, the brake controlling valve devices on the cars of the train hauled by the locomotive operate in the usual manner to locally vent fluid under pressure from the brake pipe and to supply fluid under pressure from the reservoirs on these cars to the brake cylinders on these cars to effect an application of the brakes thereon.

In addition, on this reduction in the pressure of the fluid in the brake pipe at an emergency rate there is a rapid reduction in the pressure of the fluid in the chamber 26 at the face of the piston 20 of the equalizing portion 12 of the distributing valve device 5, and this piston is moved to the right, as viewed in the drawing, thereby moving the slide valve 32 to the position in which the cavity 144 therein establishes communication between the passage 146, which communicates with the valve chamber 22 and thereby with the pressure chamber 16, and the passage 148 leading to the delay valve device 15.

As the piston 70 and the slide valve 82 of the delay valve device 15 are in their delay position at this time, the cavity 149 in the slide valve 82 does not establish communication between the passage 148 and the passage 44, and fluid under pressure supplied to the passage 148 flows therefrom to the passage 150 and at a restricted rate through the restricted portion or choke 152 to the passage 44 through which fluid flows in one direction to the chamber 42 of the application portion 14.

Fluid under pressure supplied to the passage 44 also flows therefrom in the other direction through the cavity 154 in the slide valve 82 to the passage 156 leading to the application portion 17 to increase the pressure of the fluid in this chamber.

On an increase in the pressure of the fluid in the chamber 42 of the application portion 14 this portion operates as described in detail above to supply fluid under pressure from the main reservoir 4 to the brake cylinder 2 to increase the pressure of the fluid in the brake cylinder substantially as rapidly as the pressure of the fluid in the chamber 42 is increased.

In addition, on this reduction in the pressure of the fluid in the brake pipe 1 to effect an emergency application of the brakes there is a reduction in the pressure of the fluid in the chamber 98 at the face of the piston 96 of the valve device 7, and on a predetermined reduction in the pressure of the fluid in this chamber the piston 96 is moved to the right, as viewed in the drawing, by the spring 110. On this movement of the piston 96 the valve 106 is moved away from its seat, while the stem 112 is moved away from the valve 114, which is moved to the seated position by the spring 120 to cut off the supply of fluid under pressure from the reservoir 4 to the chamber 108 and therefrom to the pipe and passage 78 leading to the chamber 76 at the face of the piston 70 of the delay valve device 15.

On movement of the valve 106 away from its seat fluid under pressure flows from the chamber 76 of the delay valve device 15 and from the timing reservoir 9 to the chamber 108, and thence to the chamber 102 from which it flows to the atmosphere at a restricted rate through the restricted passage 104.

After a time interval the pressure of the fluid in the timing reservoir 9 and in the chamber 76 of the delay valve device 15 will have been reduced by flow of fluid therefrom to the atmosphere to a value such that the force exerted on the piston 70 by the fluid under pressure in the chamber 76, together with the force exerted by the spring 80, is insufficient to hold the piston 70 in the delay position against the opposing force of the fluid under pressure in the chamber 72, and the piston 70 is thereupon moved upwardly, as viewed in the drawing, against the spring 80 to the non-delay position.

On this movement of the piston 70 the slide valve 82 is moved to a position in which the cavity 154 therein no longer establishes communication between the passages 44 and 156, and in which the cavity 149 therein again establishes communication between the passage 148 and the passage 44 so that fluid under pressure supplied from the pressure chamber 16 and the valve chamber 22 to the passage 148 by the equalizing portion 12 of the distributing valve device 5 may flow from the passage 148 through the cavity 149 to the passage 44 at a rapid rate, by-passing the choke 152, thereby rapidly increasing the pressure of the fluid in the chamber 42 of the application portion 14 and conditioning this portion to increase the rate of supply of fluid under pressure to the brake cylinder 2. As the cavity 154 does not establish communication between the passages 44 and 156 in this position of the slide valve 82, the supply of fluid under pressure to the application chamber 17 is cut off.

The timing reservoir 9 is of such volume, and the flow capacity of the restricted passage 104 is such, however, that the pressure of the fluid in the chamber 76 at the face of the piston 70 of the delay valve device 15 will not be reduced to a value low enough to permit the piston 70 to be moved to the non-delay position until after this piston has been in the delay position for a period of time long enough to permit a substantial pressure to be developed in the brake cylinder 2 of the locomotive and to permit the slack in the train to gather.

On a subsequent movement of the automatic portion of the engineer's brake valve device 10 to the release position, in which fluid under pressure is supplied to the brake pipe 1 there is an increase in the pressure of the fluid in the chamber 26 at the face of the piston 29 of the equalizing portion 12 of the distributing valve device 5, and this portion operates as described in detail in the above identified patents to release fluid under pressure from the chamber 42 at the face of the piston 40 of the application portion 14, and from the application chamber 17, while the application portion 14 operates to release fluid under pressure from the brake cylinder 2.

On the supply of fluid under pressure to the brake pipe 1 on the locomotive fluid flows therefrom through the angle cock 135 to the brake pipe on the cars of the train hauled by the locomotive, and effects the release of the brakes on these cars and the recharge of the brake equipment thereon in the usual manner.

On an increase in the pressure of the fluid in the brake pipe 1 fluid under pressure flows therefrom by way of the pipe 100 to the chamber 98 at the face of the piston 96 of the valve device 7, and on a predetermined increase in the pressure of the fluid in this chamber the piston 96 is again moved to the left, as viewed in the drawing, against the opposing force of the spring 100 so as to move the valve 106 to the seated position. On movement of the piston 96 to this position the end of the stem 112 presses against the valve 114 and moves it against the spring 120 away from its seat to again permit fluid under pressure supplied from the main reservoir 4 through the manually operated valve device 8 to the pipe 118 and the chamber 116 to flow therefrom to the chamber 108 and to the pipe and passage 78 leading to the timing reservoir 9 and to the chamber 76 at the face of the piston 70 to charge these with fluid under pressure at the pressure carried in the reservoir 4.

On a predetermined increase in the pressure of the fluid in the chamber 76 the piston 70 is again moved downwardly by the spring 80, thereby moving the slide valve 82 to the delay position to restrict the rate of increase in the pressure of the fluid supplied to the chamber 42 of the application portion 14 on an emergency application of the brakes.

If while the locomotive is employed to haul a train the engineer wishes to condition the locomotive brake equipment to provide a rapid application of the brakes on the locomotive he turns the handle 124 of the manually operated valve device 8 to the non-delay position. When the handle 124 is turned to this position the plug valve 122 is turned to a position in which it cuts off the flow of fluid from the pipe 128 to the pipe 118, and in which the passage 126 connects the pipe 118 to the atmospheric port 130.

As the pipe 118 is connected to the atmosphere the fluid under pressure present in the chamber 76 of the delay valve device 15 and in the timing reservoir 9 may escape to the atmosphere by way of the passage and pipe 78, the chamber 108, past the open valve 114 to the chamber 116, and thence to the pipe 118. On the release of fluid from the chamber 76, the piston 70 is moved from the delay position to the non-delay position by the fluid under pressure in the valve chamber 72, and the slide valve 82 is moved to the position to permit the rapid supply of fluid under pressure to the application portion 14 by the equalizing portion 12 on a subsequent emergency application of the brakes.

It will be seen that when the locomotive is not employed to haul a train the valve device 7 operates automatically to cause the delay valve device 15 to occupy its non-delay position even though the manually operated valve device 8 is in the position in which it would operate normally to condition the delay valve device to delay the application of the brakes on the locomotive on an emergency application of the brakes on the train.

It will be seen also that when the locomotive is employed to haul a train the valve device 7 operates to restore control of the delay valve device 15 to the engineer, and permits him to condition the equipment to produce either a rapid or slow application of the brakes on the locomotive on an emergency application of the brakes on the train.

While one embodiment of the improved locomotive brake equipment provided by this invention has been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a locomotive brake equipment, in combination, valve means operative to effect an application of the brakes on the locomotive, delay means operative to limit the rate at which the application of the brakes is effected, and means operative upon separation of the locomotive from another vehicle to render said delay means ineffective to limit the rate of brake application on the locomotive.

2. In a locomotive brake equipment, in combination, a brake pipe, valve means operative upon a reduction in brake pipe pressure for effecting a fluid pressure application of the brakes on the locomotive, delay means operative to restrict the rate of build up of fluid pressure in effecting an application of the brakes, and means operative upon a reduction in brake pipe pressure for rendering said delay means ineffective to restrict the rate of build up of fluid pressure.

3. In a locomotive brake equipment, in combination, a brake pipe, valve means operative upon a reduction in brake pipe pressure for effecting a fluid pressure application of the brakes on the locomotive, delay means operative to restrict the rate of build up of fluid pressure in effecting an application of the brakes, and means operative upon a reduction in brake pipe pressure after a predetermined period of time for rendering said delay means ineffective to restrict the rate of build up of fluid pressure.

4. In a locomotive brake equipment, in combination, a brake pipe, brake cylinder, valve means operative to supply fluid under pressure to the brake cylinder to effect an application of the brakes on the locomotive, delay means operative to restrict the rate at which said valve means supplies fluid under pressure to the brake cylinder, and means operative upon a prolonged reduction in brake pipe pressure after a predetermined period of time for rendering said rate restricting means ineffective to delay the rate at which fluid under pressure is supplied to the brake cylinder.

5. In a locomotive brake equipment, in combination, a brake pipe, valve means operative to effect a fluid pressure application of the brakes on the locomotive, delay valve means operative to restrict the rate of build up of fluid pressure in applying the brakes and movable to a position in which the build up in fluid pressure in applying the brakes is at a faster rate, and means for effecting movement of said delay valve means to said position upon a reduction in brake pipe pressure and after a predetermined period of time.

6. In a locomotive brake equipment, in combination, a brake pipe, valve means operative to effect a fluid pressure application of the brakes on the locomotive, delay valve means operative to restrict the rate of build up of fluid pressure in applying the brakes and movable on a reduction in the pressure of the fluid in a chamber to a position in which the build up in fluid pressure in applying the brakes is at a faster rate, and valve means operated upon a predetermined reduction in brake pipe pressure for venting fluid under pressure from said chamber at a restricted rate.

7. In a locomotive brake equipment, in combination, a brake pipe, valve means operative to effect a fluid pressure application of the brakes on the locomotive, delay valve means operative to restrict the rate of build up of fluid pressure in applying the brakes and movable on a reduction in the pressure of the fluid in a chamber to a position in which the build up in fluid pressure in applying the brakes is at a faster rate, and valve means operated upon a predetermined reduction in brake pipe pressure for venting fluid under pressure from said chamber at a restricted rate, said valve means being connected to the brake pipe at a point which is open to the atmosphere when the locomotive is not connected to another vehicle.

8. In a locomotive brake equipment, in combination, a brake pipe, valve means operative to effect a fluid pressure application of the brakes on the locomotive, delay valve means operative to restrict the rate of build up of fluid pressure in applying the brakes and movable on a reduction in the pressure of the fluid in a chamber to a position in which the build up in fluid pressure in applying the brakes is at a faster rate, and valve means operated upon a predetermined reduction in brake pipe pressure for venting fluid under pressure from said chamber at a restricted rate, said valve means being connected to the brake pipe at the flexible hose side of the brake pipe.

9. In a locomotive brake equipment, in combination, a brake pipe on the locomotive having a portion which is charged with fluid under pressure only when the locomotive is coupled to a train, a brake cylinder, application means operative on an increase in fluid pressure to effect an application of the brakes, valve means for supplying fluid under pressure to said application means, and means responsive to the pressure of the fluid in said portion of the brake pipe for controlling the rate of supply of fluid by said valve means to said application means.

10. In a locomotive brake equipment, in combination, a brake pipe on the locomotive having a portion which is charged with fluid under pressure only when the locomotive is coupled to a train, a brake cylinder, application means operative on an increase in fluid pressure to effect an application of the brakes, valve means for supplying fluid under pressure to said application means, and means subject to and operated only on a predetermined increase in the pressure of the fluid in said brake pipe portion to restrict the rate of supply of fluid by said valve means to said application means.

11. In a locomotive brake equipment, in combination, a brake pipe on the locomotive having a portion which is charged with fluid under pressure only when the locomotive is coupled to a train, a brake cylinder, application means operative on an increase in fluid pressure to effect an application of the brakes, valve means for supplying fluid under pressure to said application means, means operative on an increase in the pressure of the fluid in a chamber to restrict the rate of supply of fluid by said valve means to said application means, and means subject to and operated only on a predetermined increase in the pressure of the fluid in said brake pipe portion to permit the supply of fluid to said chamber.

12. In a locomotive brake equipment, in combination, a brake pipe on the locomotive having a portion which is charged with fluid under pressure only when the locomotive is coupled to a train, a brake cylinder, application means operative on an increase in fluid pressure to effect an application of the brakes, valve means for supplying fluid under pressure to said application means, means responsive to the pressure of the fluid in a chamber for controlling the rate of supply of fluid by said valve means to said application means, and means responsive to the pressure of the fluid in said brake pipe portion for controlling the supply of fluid to and the release of fluid from said chamber.

13. In a locomotive fluid pressure brake equipment, a pressure chamber, a brake pipe on the locomotive, a valve controlling the flow of fluid through said brake pipe, means on the locomotive for supplying fluid under pressure to the brake pipe at a point on one side of the said valve, application means operative on an increase in fluid pressure to effect an application of the brakes, valve means subject to the opposing pressures of the fluid in the brake pipe and of the fluid in the pressure chamber for supplying fluid under pressure from the pressure chamber to a communication through which fluid may be supplied to the application means, a restriction for controlling the rate of flow of fluid through said communication to the application means, a valve device subject to the pressure of the fluid in an operating chamber for controlling a by-pass passage around said restriction, and means responsive to the pressure of the fluid in the brake pipe at a point on the side of the valve therein remote from the point on the pipe to which fluid is supplied thereto for controlling the supply of fluid to said operating chamber.

14. In a locomotive fluid pressure brake equipment, in combination, a brake pipe on the locomotive, a valve interposed in said brake pipe for controlling the flow of fluid through said brake pipe, means on the locomotive for supplying fluid under pressure to said brake pipe at a point therein on one side of said valve, application means operative on an increase in fluid pressure to effect an application of the brakes, a pressure chamber, valve means subject to the opposing pressures of the fluid in the brake pipe and of the fluid in the pressure chamber for supplying fluid under pressure from the pressure chamber to a passage through which fluid is supplied to the application means, and means responsive to the pressure of the fluid in the brake pipe at a point on the side of the valve therein opposite from the point at which fluid is supplied thereto for controlling the rate of supply of fluid by said valve means to said application means through said passage.

15. In a locomotive fluid pressure brake equipment, in combination, a brake pipe on the locomotive, a valve interposed in said brake pipe for controlling the flow of fluid through said brake pipe, supply means on the locomotive for supplying fluid under pressure to said brake pipe at a point therein on one side of said valve, application means operative on an increase in fluid pressure to effect an application of the brakes, a pressure chamber, valve means subject to the opposing pressures of the fluid in the brake pipe and of the fluid in the pressure chamber for supplying fluid under pressure from the pressure chamber to a passage through which fluid is supplied to the application means, a valve device subject to the pressure of the fluid in a chamber for controlling the supply of fluid to said application means by said valve means through said passage, means for supplying fluid to said chamber from the brake pipe at a point therein on the side of the valve therein opposite the point at which fluid is supplied to said brake pipe by said supply means, and a by-pass passage extending around said valve device through which fluid may flow from said valve means to said application means at a restricted rate.

16. In a locomotive fluid pressure brake equipment, in combination, a brake pipe on the locomotive, a valve interposed in said brake pipe for controlling the flow of fluid through said brake pipe, supply means on the locomotive for supplying fluid under pressure to said brake pipe at a point therein on one side of said valve, application means operative on an increase in fluid pressure to effect an application of the brakes, a pressure chamber, valve means subject to the opposing pressures of the fluid in the brake pipe and of the fluid in the pressure chamber for supplying fluid under pressure from the pressure chamber to a passage through which fluid is supplied to the application means, a valve device subject to the pressure of the fluid in a chamber for controlling the rate of supply of fluid by said valve means to said application means through said passage, manually controlled means for supplying fluid under pressure to said chamber, and means responsive to the pressure of the fluid in the brake pipe at a point on the side of the valve therein opposite the point at which fluid is supplied thereto by said supply means for controlling the supply of fluid to said chamber by said manually controlled means.

17. In a locomotive fluid pressure brake equipment, in combination, a brake pipe on the locomotive, a valve interposed in said brake pipe for controlling the flow of fluid through said brake pipe, supply means on the locomotive for supplying fluid under pressure to said brake pipe at a point therein on one side of said valve, application means operative on an increase in fluid pressure to effect an application of the brakes, a pressure chamber, valve means subject to the opposing pressures of the fluid in the brake pipe and of the fluid in the pressure chamber for supplying fluid under pressure to a passage through which fluid may be supplied to the application means, and means responsive to the pressure of the fluid in the brake pipe at a point on the side of the valve therein opposite from the point at which fluid is supplied thereto by said supply means for controlling the rate of supply of fluid by said valve means to said application means through said passage.

18. In a locomotive fluid pressure brake equipment, in combination, a brake pipe on the locomotive, a valve interposed in said brake pipe for controlling the flow of fluid through said brake pipe, supply means on the locomotive for supplying fluid under pressure to said brake pipe at a point therein on one side of said valve, application means operative on an increase in fluid pressure to effect an application of the brakes, a pressure chamber, valve means subject to the opposing pressures of the fluid in the brake pipe and of the fluid in the pressure chamber for supplying fluid under pressure from the pressure chamber to a passage through which fluid is supplied to the application means, a valve device subject to the pressure of the fluid in a chamber for controlling the rate of supply of fluid by said valve means to said application means through said passage, said valve device being operative on a reduction in pressure in said chamber to permit fluid to be supplied to said application means at a rapid rate, and means subject to and operated upon a reduction in pressure of the fluid in the brake pipe at a point therein on the side of the valve therein remote from the point of supply of fluid thereto by said supply means for releasing fluid from said chamber.

19. In a locomotive fluid pressure brake equipment, in combination, a brake pipe on the locomotive, a valve interposed in said brake pipe for controlling the flow of fluid through said brake pipe, supply means on the locomotive for supplying fluid under pressure to said brake pipe at a point therein on one side of said valve, application means operative on an increase in fluid pressure to effect an application of the brakes, a pressure chamber, valve means subject to the opposing pressures of the fluid in the brake pipe and of the fluid in the pressure chamber for supplying fluid under pressure from the pressure chamber to a passage through which fluid is supplied to the application means, a valve device subject to the pressure of the fluid in a chamber for controlling the rate of supply of fluid by said valve means to said application means through said passage, said valve device being operative on an increase in pressure in said chamber to restrict the rate at which fluid may be supplied to said application means by said valve means, and means subject to and operated on a predetermined increase in the pressure of the fluid in the brake pipe at a point therein on the side of the valve therein remote from the point of supply of fluid thereto by said supply means for supplying fluid under pressure to said chamber.

20. In a locomotive fluid pressure brake equipment, in combination, a brake pipe on the locomotive, a valve interposed in said brake pipe for controlling the flow of fluid through said brake pipe, supply means on the locomotive for supplying fluid under pressure to said brake pipe at a point therein on one side of said valve, application means operative on an increase in fluid pressure to effect an application of the brakes, a pressure chamber, valve means subject to the opposing pressures of the fluid in the brake pipe and of the fluid in the pressure chamber for supplying fluid under pressure from the pressure chamber to a passage through which fluid is supplied to the application means, a timing reservoir, a valve device responsive to the pressure of the fluid in said reservoir for controlling the rate of supply of fluid by said valve means to said application means through said passage, and means responsive to the pressure of the fluid in the brake pipe at a point therein on the side of the valve therein remote from the point at which fluid is supplied to the brake pipe by said supply means for controlling the supply of fluid to said timing reservoir and for also releasing fluid from said reservoir at a restricted rate.

21. In a locomotive fluid pressure brake equipment, in combination, a brake pipe on the locomotive, a valve interposed in said brake pipe for controlling the flow of fluid through said brake pipe, supply means on the locomotive for supplying fluid under pressure to said brake pipe at a point therein on one side of said valve, application means operative on an increase in fluid pressure to effect an application of the brakes, a pressure chamber, valve means subject to the opposing pressures of the fluid in the brake pipe and of the fluid in the pressure chamber for supplying fluid under pressure from the pressure chamber to a passage through which fluid is supplied to the application means, a timing reservoir, a valve device responsive to the pressure of the fluid in said reservoir for controlling the rate of supply of fluid by said valve means to said application means through said passage, means responsive to the pressure of the fluid in the brake pipe at a point therein on the side of the valve therein remote from the point at which fluid is supplied to the brake pipe by said supply means for controlling the supply of fluid to said timing reservoir and for also releasing fluid from said reservoir at a restricted rate, and manually controlled means for controlling the supply of fluid to said reservoir by said means.

ELLERY R. FITCH.